United States Patent
Fan (10) Patent No.: US 8,518,587 B2
(45) Date of Patent: Aug. 27, 2013

(54) $CO_2$ TOLERANT ALKALINE FUEL CELLS AND ALKALINE BATTERIES

(75) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 960 days.

(21) Appl. No.: 12/406,980

(22) Filed: Mar. 19, 2009

(65) Prior Publication Data

US 2010/0239921 A1    Sep. 23, 2010

(51) Int. Cl.
*H01M 8/06* (2006.01)
*B01D 53/14* (2006.01)

(52) U.S. Cl.
USPC ........... 429/410; 429/480; 429/482; 429/501; 429/535; 423/226

(58) Field of Classification Search
USPC .......... 429/410, 501, 535, 480, 482; 423/226
See application file for complete search history.

(56) References Cited

U.S. PATENT DOCUMENTS

| 5,376,614 A | * | 12/1994 | Birbara et al. | 502/402 |
| 6,437,012 B1 | * | 8/2002 | Wang | 521/32 |
| 6,627,035 B2 | | 9/2003 | Fan et al. | |
| 2005/0158632 A1 | | 7/2005 | Wang Chen et al. | |

FOREIGN PATENT DOCUMENTS

WO    WO 2008096244    *    8/2008

OTHER PUBLICATIONS

Tajima et al. An Electrolytic System That Uses Solid-Supported Bases for In Situ Generation of a Supporting Electrolyte from Acetic Acid Solvent Angew. Chem, 2005,117, 1138-1141.*
Hibbs, Michael R. et al., "Poly(phenylene)-based Anion Exchange Membranes for Alkaline Fuel Cells" http://ecsmeet7.peerx-press.org/ms_files/ecsmeet7/2008/12/11/00000661/00/661_0_arl_0_kbqbhk.pdf, (2008).
Tewari, A. et al., "Quantification of Carbon Dioxide Poisoning in Air Breathing Alkaline Fuel Cells", Journal of Power Sources, 153 (2006) 1-10.
Bourzac, Katherine, "Platinum-Free Fuel Cell", Technology Review (MIT), http://www.technologyreview.com/energy/21838/, Dec. 16, 2008.

* cited by examiner

*Primary Examiner* — Patrick Ryan
*Assistant Examiner* — Alex Usyatinsky
(74) *Attorney, Agent, or Firm* — Pauley Petersen & Erickson (57) ABSTRACT

An alkaline electrochemical device having an alkaline electrolyte disposed between an anode electrode and a cathode electrode, where the anode electrode and/or the cathode electrode is provided with a $CO_2$ inhibitor which substantially eliminates poisoning of the device by $CO_2$. The device may be an alkaline fuel cell or an alkaline battery. In one embodiment, the electrolyte is an anion exchange polymeric alkaline electrolyte membrane.

9 Claims, 7 Drawing Sheets

CO₂ TOLERANT ALKALINE FUEL CELLS AND ALKALINE BATTERIES

BACKGROUND OF THE INVENTION

1. Field of the Invention

This invention relates to alkaline fuel cells and alkaline batteries. In one aspect, this invention relates to alkaline fuel cells and alkaline batteries which are tolerant to $CO_2$, a known "poison" to the alkaline electrolyte of alkaline fuel cells and alkaline batteries. In one aspect, this invention relates to alkaline fuel cells and alkaline batteries employing polymeric anion exchange alkaline electrolyte membranes. In one aspect, this invention relates to $CO_2$ tolerant alkaline electrolyte membrane fuel cells and batteries. In one aspect, this invention relates to $CO_2$ tolerant polymeric anion exchange alkaline electrolyte membranes.

2. Description of Related Art

Alkaline fuel cells produce power through a redox reaction between hydrogen and oxygen. At the anode electrode, hydrogen is oxidized according to the reaction $$H_2 + 2OH^- \rightarrow 2H_2O + 2e^-$$

producing water and releasing two electrons. The electrons flow through an external circuit to the cathode electrode at which oxygen is reduced according to the reaction $$O_2 + 2H_2O + 4e^- \rightarrow 4OH^-$$

producing hydroxide ions. The net reaction consumes one oxygen molecule and two hydrogen molecules in the production of two water molecules. Electricity and heat are formed as by-products of this reaction.

In a conventional alkaline fuel cell, the cathode and anode electrodes are gas diffusion electrodes comprising a catalyst layer, a catalyst support layer, and a gas diffusion layer, and the electrodes are separated by a porous matrix, e.g. a nylon sponge, saturated with an aqueous alkaline solution, such as potassium hydroxide (KOH). Aqueous alkaline solutions do not normally reject carbon dioxide ($CO_2$) as a result of which the fuel cell is easily "poisoned" through the progressive carbonation of the solution in accordance with the reaction $$CO_2 + 2OH^- \rightarrow CO_3^{-2} + H_2O$$

This reaction leads to a decrease in the overall performance of the alkaline fuel cell overtime. In addition, carbonate precipitation in the cathode impairs the performance because of the three-phase boundary.

In the operation of a conventional alkaline fuel cell, air is provided to the gas diffusion layer of the cathode through which it is transmitted to the catalyst support layer and then the catalyst layer, which is saturated, for example, with KOH solution. If the air contains $CO_2$ or if fuel oxidation produces $CO_2$, the $CO_2$ will react with the KOH to form $K_2CO_3$ in the catalyst layer, producing the following effects: a) reduction in the $OH^-$ concentration and fuel oxidation/oxygen reduction kinetics; b) increase in the electrolyte viscosity resulting in lower diffusion coefficients and lower limiting currents; c) the eventual precipitation of carbonate salts in the pores of the porous electrode; d) reduction in oxygen solubility; and e) reduction in electrolyte conductivity. A similar mechanism applies to alkaline batteries, especially air-metal batteries.

Alkaline membrane fuel cells, in which the electrolyte is an anion exchange membrane, offer significant advantages over conventional aqueous alkaline-solution based alkaline fuel cells in that membrane based systems avoid issues of electrolyte migration, mitigate corrosion concerns, can be operated with differential pressures, and offer design simplification. Most significantly, alkaline membrane fuel cells are able to operate without the noble metal catalysts employed in conventional alkaline fuel cells. However, low $OH^-$ conductivity, water swelling, and chemical stability are problematic with conventional alkaline exchange membranes. Low $OH^-$ conductivity of conventional anion exchange alkaline membrane fuel cells has been addressed by doping of the membrane with KOH. However, the use of KOH provides the opportunity for $CO_2$ poisoning. For these reasons, conventional alkaline fuel cells typically operate on pure oxygen, or at least purified air.

The technology most widely used for $CO_2$ removal is amine adsorption, but amine plants are complex and expensive. Membrane plants using $CO_2$-selective cellulose acetate membranes have been in use since the 1980s and currently, the largest membrane facility for $CO_2$ removal operates at 700 million scfd (standard cubic feet per day). Another known technology for $CO_2$ removal is the morphysorb process which selectively removes acid gases, such as $H_2S$, $CO_2$, COS, and other components. Accordingly, there is a need for an anion exchange alkaline membrane fuel cell which is tolerant to $CO_2$ so as to eliminate the need for $CO_2$ removal.

SUMMARY OF THE INVENTION

It is, thus, one object of this invention to provide an alkaline fuel cell and alkaline battery which are both highly anion conductive and $CO_2$ tolerant.

This and other objects of this invention are addressed by an electrochemical device comprising an alkaline electrolyte disposed between an anode electrode and a cathode electrode, and $CO_2$ inhibitor means for reducing the effects of $CO_2$ on the electrochemical device, said $CO_2$ inhibitor means disposed in at least one of said electrolyte, said anode electrode, and said cathode electrode. In accordance with one embodiment of this invention, a $CO_2$ inhibitor, which comprises a $CO_2$-adsorption component bound with a polymer, is embedded within, and/or disposed on the surface of, the gas diffusion layer of at least one of the anode and cathode electrodes. In accordance with one embodiment, the electrolyte is a solid polymer anion exchange alkaline electrolyte membrane and the electrodes are gas diffusion electrodes comprising a catalyst layer adjacent the alkaline electrolyte membrane supported on a catalyst support layer and a gas diffusion layer disposed adjacent the catalyst layer. In accordance with another embodiment of this invention, the electrolyte is a $CO_2$ tolerant solid polymer anion exchange alkaline electrolyte membrane.

This and other objects of this invention are also addressed by a method for inhibiting $CO_2$ transmission in an alkaline electrochemical device having an alkaline electrolyte disposed between a gas diffusion cathode electrode and a gas diffusion anode electrode comprising the step of embedding a $CO_2$ inhibitor in, or on the surface of, the gas diffusion layer of at least one of the gas diffusion anode electrode and the gas diffusion cathode electrode. In accordance with one embodiment, the electrochemical device is an anion exchange alkaline electrolyte membrane fuel cell having a solid polymer alkaline electrolyte membrane disposed between the electrodes. In accordance with another embodiment of this invention, the electrochemical device is an open-air alkaline battery.

BRIEF DESCRIPTION OF THE DRAWINGS

These and other objects of this invention will be better understood from the following detailed description taken in conjunction with the drawings wherein.

DETAILED DESCRIPTION OF THE PRESENTLY PREFERRED EMBODIMENTS

Figure 1:
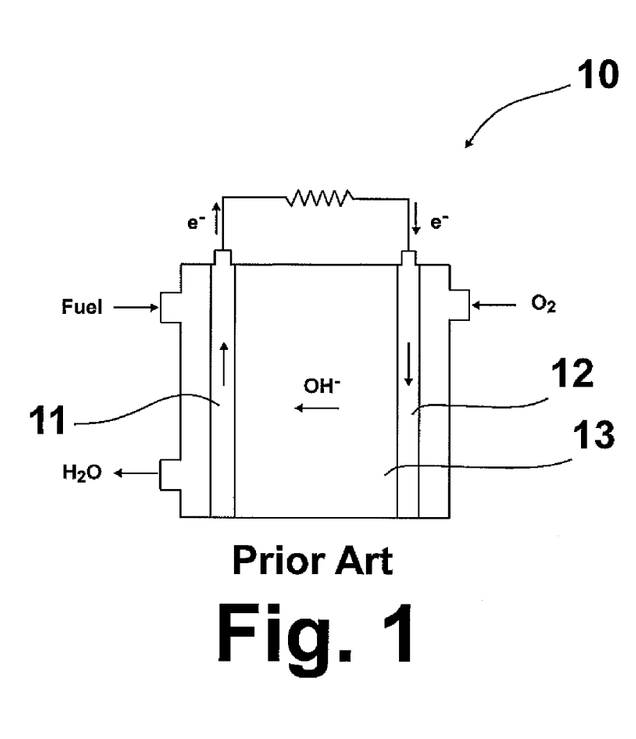
FIG. 1 is a schematic diagram of a conventional alkaline electrolyte electrochemical device.
Figure 2:
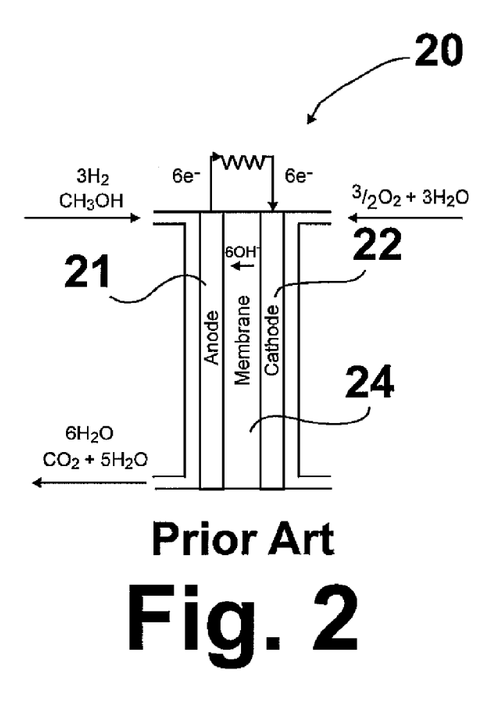
FIG. 2 is a schematic diagram of a conventional anion exchange alkaline membrane fuel cell.
Figure 6:
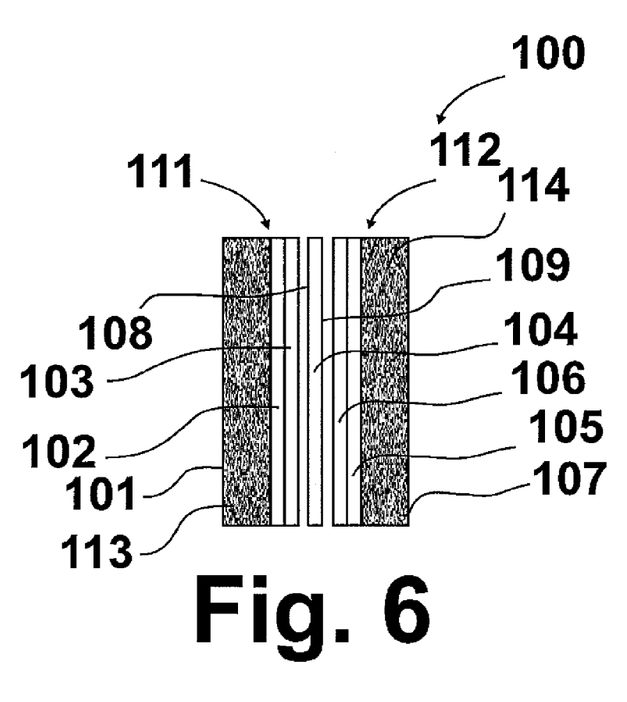
FIG. 6 is a schematic diagram of a partially exploded lateral view of an anion exchange alkaline membrane fuel cell in accordance with one embodiment of this invention.

FIG. 1 shows a conventional alkaline electrochemical device in the form of an alkaline fuel cell. As shown therein, a conventional alkaline fuel cell 10 comprises an anode electrode 11, a cathode electrode 12, and an alkaline electrolyte 13 disposed there between. FIG. 2 shows a conventional anion exchange alkaline membrane fuel cell 20 comprising anode electrode 21, cathode electrode 22, and polymer electrolyte membrane 24 disposed there between. FIG. 6 shows an anion exchange alkaline membrane fuel cell 100 in accordance with one embodiment of this invention comprising an anion exchange alkaline electrolyte membrane 104 having an anode facing side 108 and a cathode facing side 109 disposed between a gas diffusion anode electrode 111 and a gas diffusion cathode electrode 112. The anode electrode, disposed on the anode facing side of the anion exchange membrane, comprises an anode catalyst layer 103 adjacent the anion exchange membrane disposed on a carbon-based anode catalyst support layer 102 and a porous anode gas diffusion layer 101 adjacent the anode catalyst support layer. Similarly, the cathode electrode, disposed on the cathode facing side of the anion exchange membrane, comprises a cathode catalyst layer 106 adjacent the anion exchange membrane disposed on a carbon-based cathode catalyst support layer 105 and a porous cathode gas diffusion layer 107 adjacent the cathode catalyst support layer. Both the anode and cathode gas diffusion layers are preferably made of carbon cloth. The catalyst layers 103, 106, typically applied as a catalyst ink, are typically constructed of a plurality of catalyst particles bound together by a binder material. Methods for producing gas diffusion electrodes are well known in the art. See, for example, U.S. Pat. No. 6,627,035, which is incorporated by reference herein.

As previously indicated, one of the advantages of an anion exchange alkaline electrolyte membrane fuel cell is the ability to operate without the use of expensive noble metal catalysts. Accordingly, in accordance with one embodiment of this invention, the anode catalyst layer comprises nickel and the cathode catalyst layer comprises silver.

Figure 3:
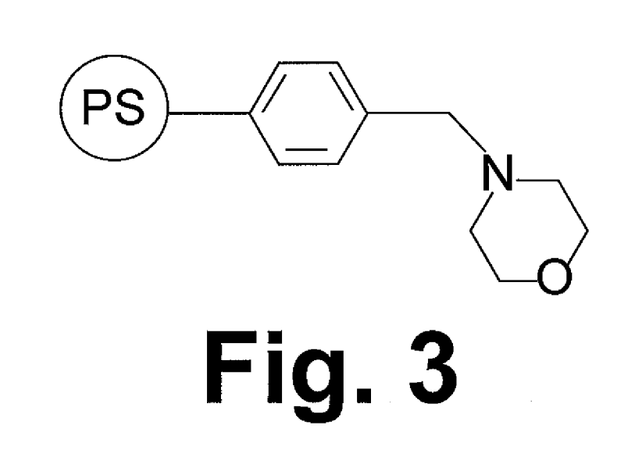
FIG. 3 is a diagram of polymer-bound morpholine employed as a $CO_2$ inhibitor in accordance with one embodiment of this invention.

To prevent poisoning of the alkaline electrolyte by the transmission of $CO_2$ through the cathode electrode into the alkaline electrolyte, the porous cathode gas diffusion layer 107 comprises a $CO_2$ inhibitor 114. Modification of the gas diffusion layer for inclusion of the $CO_2$ inhibitor must take into account the stability of the inhibitor under fuel cell and battery operating conditions and the gas permeability of the inhibitor for fuel cells and batteries. The $CO_2$ inhibitor for use in this invention is in the form of a polymer-bound $CO_2$ adsorbent. While any $CO_2$ adsorbent may be employed, in accordance with one preferred embodiment of this invention, the $CO_2$ adsorbent is morpholine, which has been used to scavenge acid gases. However, morpholine by itself is easy to evaporate and not very stable in air. FIG. 3 shows a polymer (polystyrene (PS))-bound morpholine structure for use in accordance with one embodiment of this invention which has both good stability and good porosity due to the cross-linked structure and carbon black support. Suitable polymers for use in the $CO_2$ inhibitor include polystyrene, polyimide, polyamide, polymer-bound imides, polymer-bound amides, polyacrylic acid, polyvinyl alcohol, polybenzimidazole, and combinations and derivatives thereof. The polymer-bound $CO_2$ adsorbent may be applied to the gas diffusion layer by dipping of the gas diffusion layer in a solution comprising the polymer-bound $CO_2$ adsorbent.

In accordance with one embodiment of this invention, the anode electrode also comprises a $CO_2$ inhibitor 113 disposed within the anode electrode gas diffusion layer, whereby $CO_2$ which may be generated by the fuel oxidation is substantially prevented from being adsorbed by the alkaline electrolyte membrane. In particular, the catalyst layer of the anode electrode promotes $CO_2$ desorption. In addition, any $CO_2$ adsorbed on the membrane will be decomposed when the fuel cell temperature reaches more than 55° C.

Analysis of the reactant and product species at the anode of an alkaline membrane fuel cell shows that the only way to maintain $OH^-$ conductivity through the alkaline electrolyte membrane is to increase the decomposition rate of carbonate ($CO_3^{2-}$), bicarbonate ($HCO_3^-$), and carbamate ($N_4NH_2CO_2$). Thus, the percentage of nitrogen in the membrane must increase to provide a high N, —NH, and —$NH_2$ concentration for $OH^-$ conductivity while maintaining the polymer's stable structure. With a high percentage of nitrogen, i.e. about 5% or greater, only carbamate is formed, which is not stable in aqueous solutions at elevated temperatures, i.e. greater than about 55° C.

Figure 5:
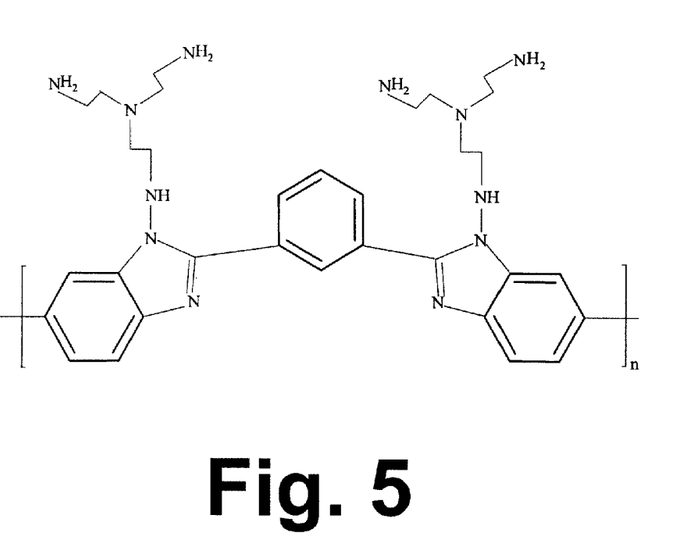
FIG. 5 is a diagram of an aminated poly(2,5-benzimidazole) membrane for an anion exchange alkaline membrane fuel cell in accordance with one embodiment of this invention.

High temperature proton exchange membranes based on poly(2,5-benzimidazole) (ABPBI) are known. The polybenzimidazole (PBI) backbone thereof has been shown to be stable under fuel cell operating conditions at temperatures as high as 160° C. I have found that animation of the ABPBI membrane for use in an alkaline electrolyte membrane fuel cell provides anion conductivity an order of magnitude better than commercially available anion exchange membranes, has good mechanical strength, has an operating temperature in the range of about −40° C. to about 160° C., and is $CO_2$ tolerant. Aminated ABPBI for use in alkaline membrane fuel cells provides the following advantages: reduced swelling of the anion exchange membrane and increased membrane stability; production of water at the anode side which is consumed at the cathode side, thereby reducing the cathode water management problem and ultimately eliminating cathode humidification; use of the amine to cross-link to the ABPBI membrane, which amine is a strong base with a pH of 12.75 in a 60 wt % aqueous solution, providing a membrane having less fuel crossover than conventional linear membranes such as NAFION®; and no requirement of KOH in the fuel solution. FIG. 5 shows the aminated membrane structure for use as an alkaline electrolyte membrane in an alkaline fuel cell in accordance with one embodiment of this invention.

Example 1

In this example, the alkaline electrolyte membrane in accordance with one embodiment of this invention was prepared by dissolving 3.5 g of poly(vinyl alcohol-co-ethylene) in 45 g of dimethyl sulfoxide (DMSO). The solution was heated to 60° C. to facilitate the quick dissolve of the polymer. The solution was then cooled to room temperature, after which 1.5 g of tris(2-aminoethyl)amine was added into the polymer solution and stirred to be homogeneous. 1.6 g of formaldehyde (37% in water) solution was added drop by drop into the polymer solution while stirring. At less than two minutes of time, the solution was cast onto a flat TEFLON® substrate following which the clear solution turned cloudy. The cast membrane on the TEFLON substrate was placed overnight in an oven at 80° C. to dry and cure. Thereafter, the membrane was washed in deionized water and peeled off the substrate.

A single fuel cell was used to test the membrane conductivity. The membrane was assembled in a fuel cell block with a gas diffusion layer on both sides of the membrane serving as current collectors. The active area was 50 cm². The single cell was placed into a fuel cell test station and humidified gas was passed through both sides of the cell. The carrying gas during the test was $N_2/N_2$ or $N_2/CO_2$. A Princeton Applied Research Potentiostat/Galvanostat model 263A and a Solartron SI1260 impedance gain/phase analyzer was used to measure resistance. All resistances were measured at 100 kHz. During a period of one minute, thirteen readings were taken at five second intervals. All of the readings were averaged to reach a resistance value.

Figure 4:
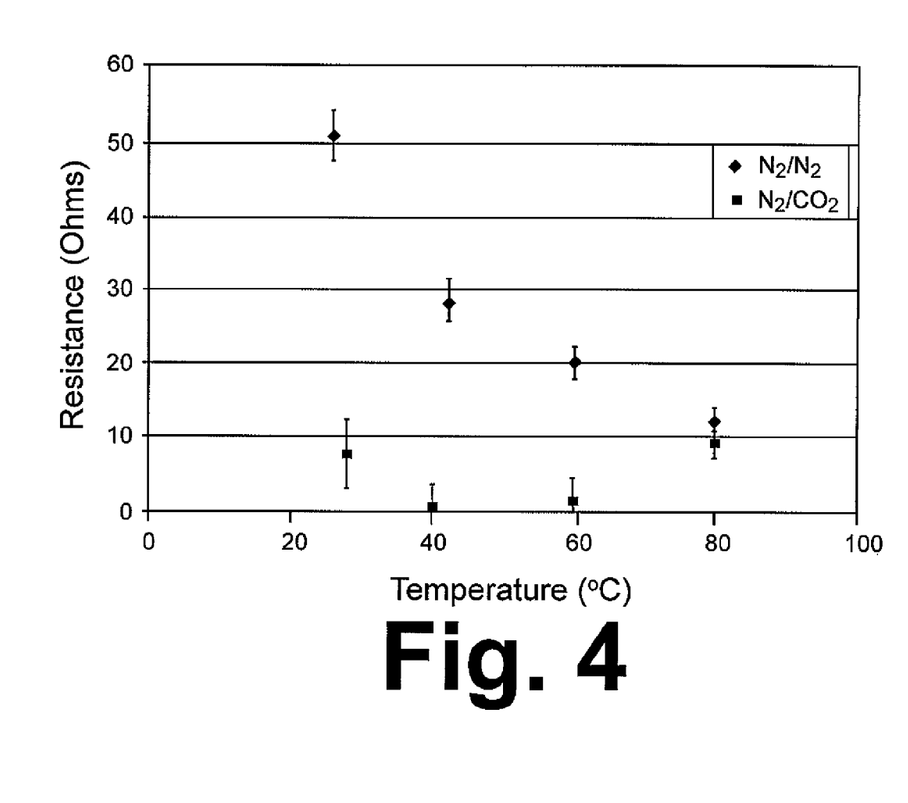
FIG. 4 is a diagram showing membrane resistance at various temperatures and different humidified purging gases.

The results of membrane resistance tests conducted at various temperatures with $N_2$, $CO_2$ purge gas are shown in FIG. 4. With $CO_2$ purge gas on one side of the membrane instead of $N_2$, the resistance was lower. The conductivity under $CO_2$ was approximately 0.05 mS. Surprisingly, the $CO_2$ did not reduce the membrane conductivity; rather, the membrane conductivity was increased due to ionic amine formation under water humidification and $CO_2$ presence.

Example 2

In this example, 5% poly(2,5)benzimidazole (ABPBI) was dissolved in 3% NaOH/EtOH solution at 70° C. Tris(2-aminoethyl)amine (TAEA) was added into the polymer solution to provide a ratio of ABPBI:TAEA of about 7:3 and stirred to be homogeneous. The solution was then cooled to room temperature and filtered to remove some undissolved polymer prior to casting. 1.6 g of formaldehyde (37% in water) solution was added drop by drop into 50 ml of the polymer solution while stirring. After less than two minutes, the solution was cast onto a flat TEFLON substrate.

Example 3

Figure 7:
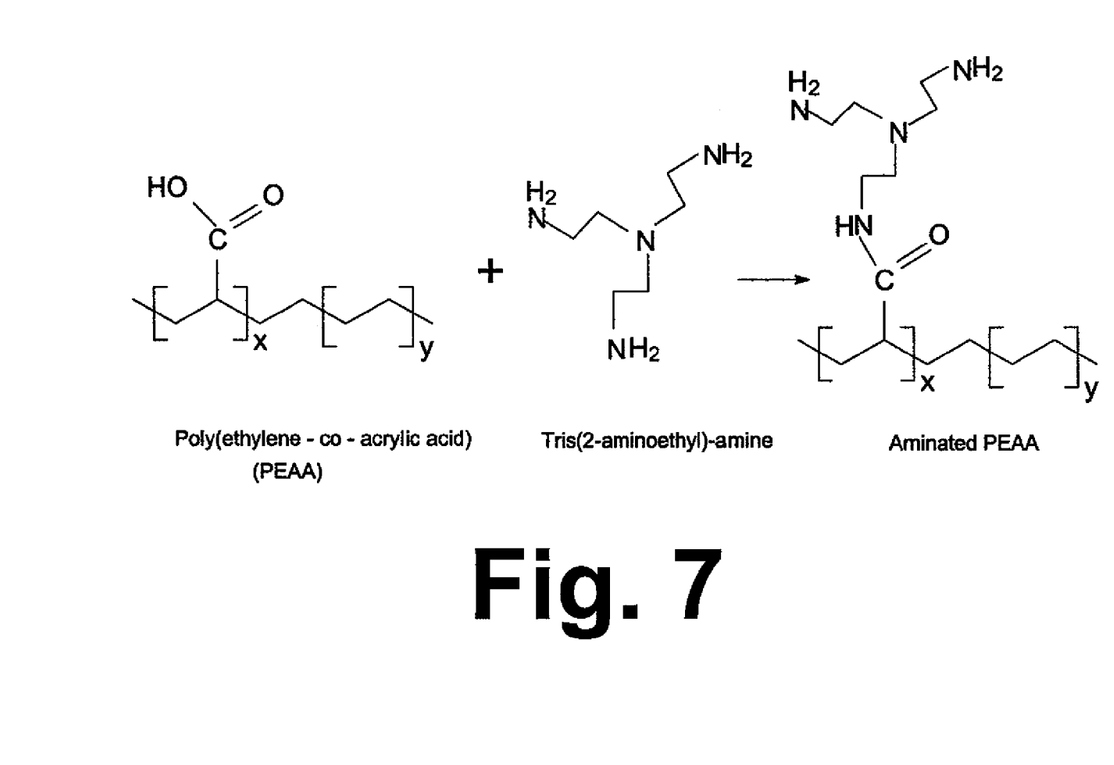
FIG. 7 is a diagram showing the reactants and end product structures for producing a polymeric membrane for use in accordance with one embodiment of this invention.

In this example, a high yield aminated polymer was produced by dissolving 3.5 g Poly(ethylene-co-acrylic acid) (20% acrylic acid, Aldrich Chemical) in 45 g dimethyl sulfoxide (DMSO). The solution was then cooled to room temperature, after which 1.5 g of tris(2-aminoethyl)amine was added into the polymer solution and stirred to be homogeneous. The solution was then heated to 95° C. for the acrylic acid group to react with the amine group to remove water for 30 minutes. The solution was then cooled to room temperature and cast onto a flat TEFLON® substrate. The cast membrane was then placed in an oven at 95° C. to dry and cure. The structures of the reactants and end product are shown in FIG. 7.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. An electrochemical device comprising:
   one of an alkaline electrolyte and an anion exchange electrolyte membrane disposed between an anode electrode and a cathode electrode; and
   means for reducing the effects of $CO_2$ on said electrochemical device disposed in at least one of, said anion exchange alkaline electrolyte membrane, said anode electrode, and said cathode electrode wherein said means comprises a polymer-bound $CO_2$ adsorbent comprising substituted amino group, and said polymer selected from the group consisting of polystyrene, polyimide, polyamide, polymer-bound imides, polymer-bound amides, polyacrylic acid, polyvinyl alcohol, polybenzimidazole, and combinations thereof.

2. The electrochemical device of claim 1,
   wherein said anode electrode is a gas diffusion electrode comprising a catalyst layer disposed on a catalyst support layer, said catalyst support layer disposed on a gas diffusion layer, and said means disposed one of within and on a surface of an anode gas diffusion layer of said anode electrode.

3. The electrochemical device of claim 1, wherein said anion exchange alkaline electrolyte membrane is $CO_2$ tolerant.

4. The electrochemical device of claim 1, wherein said cathode electrode is a gas diffusion electrode comprising a catalyst layer disposed on a catalyst support layer, said catalyst support layer disposed on a gas diffusion layer, and said means disposed one of within and on a surface of a cathode gas diffusion layer of said cathode electrode.

5. The electrochemical device of claim 1, wherein said $CO_2$ adsorbent comprises morpholine.

6. The electrochemical device of claim 5, wherein said polymer is polystyrene.

7. The electrochemical device of claim 1, wherein said device is an open-air alkaline battery.

8. The electrochemical device of claim 1, wherein said electrochemical device is an alkaline fuel cell.

9. The electrochemical device of claim 8, wherein said alkaline fuel cell is an anion exchange alkaline electrolyte membrane fuel cell.

* * * * *